United States Patent [19]
Batcher et al.
[11] 3,786,448
[45] Jan. 15, 1974

[54] MULTIPLE ACCESS PLATED WIRE MEMORY

[75] Inventors: Kenneth E. Batcher, Stow; John T. Franks, Jr., Tallmadge, both of Ohio

[73] Assignee: Goodyear Aerospace Corporation, Akron, Ohio

[22] Filed: Sept. 11, 1972

[21] Appl. No.: 287,947

[52] U.S. Cl. 340/174 PW, 340/174 M, 340/174 RC, 340/174 TF, 340/174 PD

[51] Int. Cl. .......... G11c 11/04, G11c 11/14

[58] Field of Search .......... 340/174 PD, 174 VA, 340/174 JA, 174 PW, 174 VC

[56] References Cited

UNITED STATES PATENTS 3,182,296 5/1965 Baldwin, Jr. et al. .......... 340/174 JA
3,432,822 3/1969 Bertelsen .......... 340/179 VA
3,531,781 9/1970 Hoshi et al. .......... 340/174 PD
3,076,181 1/1963 Newhouse et al. .......... 340/174 PD

*Primary Examiner*—James W. Moffitt
*Attorney*—J. G. Pere and E. W. Oldham

[57] ABSTRACT

The invention relates to a novel plated wire memory arrangement which not only permits word-oriented access but also bit-oriented access to the data storage bits thereof. The invention teaches the utilization of two separate and distinct sets of interrogation lines to achieve the multiple access characteristic. The invention is such as to be adaptable to the techniques and knowledge available in the present state of the art of plated wire memories but uniquely arranges a plurality of plated wires and two separate pluralities of unplated wires so as to achieve a memory array system which is not only capable of multiple mode accessing but is also characterized by a higher bit packing density than presently taught in the art.

10 Claims, 8 Drawing Figures

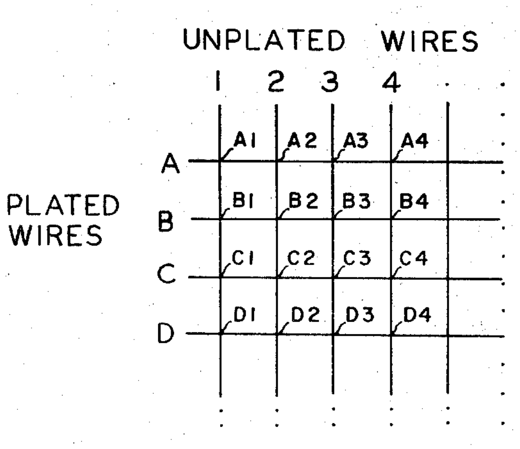
PRIOR ART FIG-1
| BIT / WORD | PW1 | PW2 | PW3 | PW4 |
|---|---|---|---|---|
| A | 2 | 3 | 4 | 1 |
| B | 1 | 2 | 3 | 4 |
| C | 4 | 1 | 2 | 3 |
| D | 3 | 4 | 1 | 2 |
FIG-3a
| WORD / BIT | PW1 | PW2 | PW3 | PW4 |
|---|---|---|---|---|
| 1 | B | C | D | A |
| 2 | A | B | C | D |
| 3 | D | A | B | C |
| 4 | C | D | A | B |
FIG. 3b
FIG-3
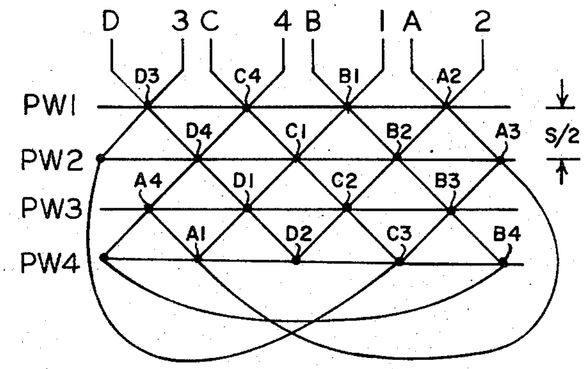
FIG-2
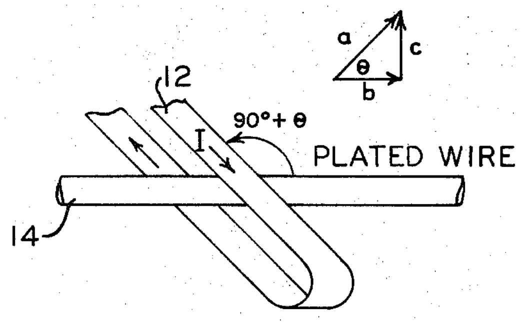
FIG-4
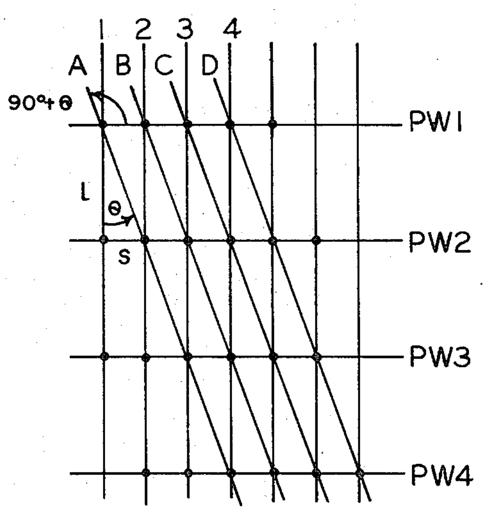
FIG-5

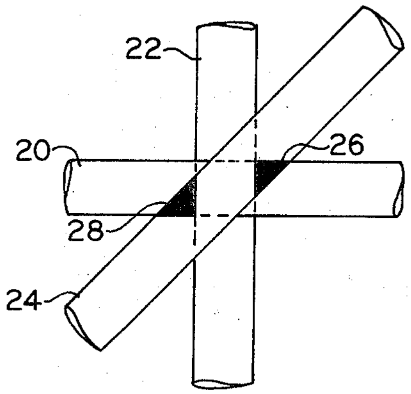
FIG-6a
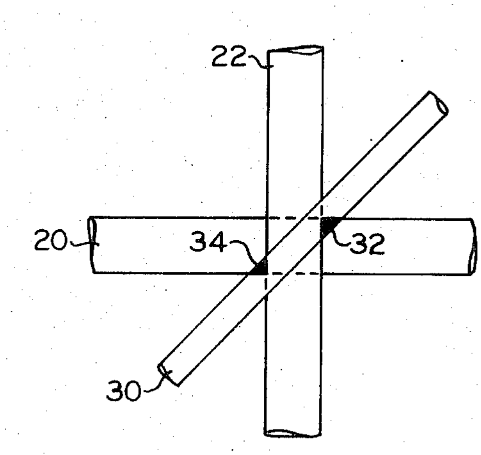
FIG-6b
FIG-6

MULTIPLE ACCESS PLATED WIRE MEMORY

BACKGROUND OF THE INVENTION

Heretofore the utilization of plated wire in the construction of memories for use in digital computers has been well known. In general, a plated wire comprises a beryllium copper wire substrate upon which an isotropic permalloy has been plated. The principle attributes of plated wire arrays include a high-speed non-destructive readout (NDRO) capability and a correspondingly fast electronic write capability. Such plated wire arrays allow the use of a small plated wire current for writing information into the memory and provide a high output signal on the plated wire when reading information from the memory. In addition, plated wire may be readily fabricated by means of inexpensive continuous processes which consequently leads to economical memory units. Such memory units are readily available for use in conventional digital computer systems but have been found to be even more compatible to use in associative processor computer systems.

Further, it has heretofore been known that a solid state memory for use in a digital computer might readily be constructed so as to allow access to the data storage bits thereof in either of two distinct modes. That is, data might be written into or read from the memory serial by word and parallel by bit (word-oriented mode) or serial by bit and parallel by word (bit-oriented mode). It has further become known that digital computer systems may readily be developed wherein access may be made to the data storage bits thereof in such a manner as to allow access to all bits of one word, or one bit of all words. A memory system which allows such access has been fully disclosed in co-pending patent application Ser. No. 253,388 filed May 15, 1972 and assigned to the Goodyear Aerospace Corporation of Akron, Ohio.

A particular attempt at the development of a ferrite core memory system which is capable of being accessed in both a word-oriented mode and a bit-oriented mode was disclosed in U.S. Pat. No. 3,277,449 for "Orthogonal Computer" by one William Schooman. This patent teaches the construction of a ferrite core memory such that access might be made to the cores thereof in either a horizontal or a vertical mode; these modes correspond to the above-mentioned word-oriented mode and bit-oriented mode. However, this system teaches that each mode of accessing requires its own input/ouptut system and arithmetic unit. This is particularly required since two sets of input/output lines are provided, one for a vertical-access and the other for a horizontal-access. Quite obviously, this system is extremely expensive to build, complex in nature, possessive of a redundancy of circuits, and consequently difficult to maintain.

It can be seen then that the present state of the art teaches the utilization of plated wire memory units in conventional and associative computer systems, the construction and utilization of mlti-dimensional access solid state memories, and the construction and operation of a complex computer system utilizing a ferrite core memory which allows access thereto in both a vertical and horizontal mode. However, a large void has been left in the field of multi-dimensional access memories. This void may readily be filled by a memory system having the aforementioned attributes of a plated wire memory which allows access on a single set of input/output lines, the plated wires themselves, in either a bit-oriented mode or a word-oriented mode.

It is therefore the general object of the instant invention to present a multiple access plated wire memory which allows access to the data stored therein in each of two distinct modes.

A further object of the instant invention is to present a plated wire memory concept which teaches in any of numerous manners the organization of a plated wire memory capable of being accessed in each of two particular modes.

Still a further object of the instant invention is to present a multiple access plated wire memory possessive of high density packing characteristics.

Another object of the invention is to present a multiple access plated wire memory wherein in either of two modes of access to the data storage bits thereof no condition will exist where adjacent bits are disturbed simultaneously, thus lowering the creep within the system.

Yet a further object of the instant invention is to present a multiple access plated wire memory which is inexpensive to construct, rapid in access time, capable of non-destructive readouts, accurate in operation, and adaptable to use in any of numerous systems.

The aforementioned objects and other objects which will become apparent as the description proceeds are achieved by a multiple access memory array comprising; a plurality of plated wires arranged with respect to each other such that no plated wires cross each other, a first plurality of interrogation wires placed in such a relation to the plurality of plated wires that each of the plated wires and each of the plurality of interrogation wires cross each other at only one point, and a second plurality of interrogation wires in such a relation to the plurality of plated wires and the first plurality of interrogation wires that each of the second plurality of interrogation wires crosses each of the plated wires at only one point, that point being the same point where one of the first plurality of interrogation wires also crosses the plated wire.

For a better understanding of the invention reference should be made to the accompanying drawings wherein:

FIG. 1 illustrates the basic organization of a plated wire memory;

FIG. 2 illustrates the unique data storage arrangement and access technique of the instant invention;

FIG. 3, comprising FIGS. 3*a* and 3*b*, illustrates the shifted lineal order of data associated with a word-oriented access and a bit-oriented access of an array following the teachings of the instant invention;

FIG. 4 shows the electromagnetic flux characteristics at the cross over of an unplated and a plated wire following the teachings of the instant invention;

FIG. 5 depicts a variation on the theme of the instant invention and illustrates the interrelationship between the plated wire spacing, the bit spacing, and the angles of cross over between the unplated wires and the plated wires; and FIG. 6, comprising FIGS. 6*a* and 6*b*, illustrates the problem of fringing and a means of minimizing such problem in accordnace with the concepts of the invention.

Referring now to the drawings and more particularly FIG. 1, a basic understanding of the general arrangement of a standard plated wire memory may be achieved. Although such memories are well understood by those skilled in the art, a general description thereof is presented such that a full understanding of the instant invention might be had. It should be noted from FIG. 1 that the data storage elements of such an array are created at the points of crossover between plated wires and unplated wires. The plated wires, designated generally by the letters A, B, C, etc. are characterized by a thin permalloy film which provides the magnetic storage elements of the array. As is well understood by thsoe skilled in the art, the unplated wires, designated generally by the numerals 1, 2, 3 and so forth, are the basic interrogate or access lines whereby the particular storage elements of the array created by the crossover of the unplated and plated wires may be accessed for either reading or writing data thereonto. The actual data storage elements at the crossovers of the plated and unplated wires are designated generally by the letter corresponding to the plated wire and the numeral corresponding to the unplated wire; for example, it should be noted that storage element C2 is created by the crossover between plated wire C and unplated wire 2. It should be readily understood by those skilled in the art that depending upon the convention used in designating word lines or bit lines in the system the storage element C2 might either be bit 2 of word C or bit C of word 2. That is, if the plated wires designated by the letters are to be treated as word lines and the unplated wires designated by the numerals are to be treated as bit lines then C2 would designate bit 2 of word C and if bit line 2 were to be interrogated then bit 2 of every word would be accessed for either reading or writing. This type of an array is generally designated as an associative array. However, if the convention had been reversed such that C2 would be bit C of word 2 then the array would operate as a conventional digital array. It should further be noted that while the illustration of FIG. 1 is presented solely for the purpose of giving a general understanding of plated wire memories, many of the elements commonly used in such arrays have been omitted for purposes of illustration. For example, the return path of the unplated wires under the plated wires has not been shown, nor have the driving circuits used for driving the plated and unplated wires, nor have dummy lines acting in coordination with the plated wires for noise suppression pruposes, and nor have the sense amps commonly used in conjunction with the plated wires and dummy lines for reading data.

It can be seen then by referring to the array illustrated in FIG. 1 that if the unplated wires are designated as bit lines and the plated wires are designated as word lines then interrogation of any one of the unplated lines will allow access to one bit of all words, bit-oriented mode. If the unplated wires are to be designated as word lines and the plated wires as bit lines then interrogation of any one of the unplated wires would provide access to all bits of one word, word-oriented mode. However, once the array has been constructed and the convention designated then the array is limited to the mode of access designated by the convention. That is, the array will be totally limited to either word-oriented access or bit-oriented access but will not be capable of operating in both modes of access.

Referring now to FIG. 2 a basic understanding of the instant invention may be had. The illustration presented in the figure again is for illustrative purposes only and is not to be constructed as thoroughly depicting the total apparatus of the invention. Herein it may be seen that the invention teaches the utilization of a single set of plated wires, designated by PW1 through PW4, and two sets of unplated wires, the first set designated by the letters A through D, and the second designated by the numerals 1 through 4. The two sets of unplated wires pass over the plated wires in such a manner that all three wires share common crossover points. Each unplated wire passes over a plated wire at one point and at that same point another unplated wire also crosses over the plated wire. The crossover points, as in the case of the general plated wire array of FIG. 1, create the data storage elements of the array. These data storage elements are designated by the letter and numeral corresponding to the unplated wires at the crossover point. For example, data storage element A4 is created on plated wire PW3 at the point where unplated wires A and 4 crossover the plated wire PW3. Consequently, each data storage element of the array has associated with it two particular means of access thereto. For example, access may be made to data storage element A4 by means of either the unplated wire A or the unplated wire 4 and their respective current drivers. Once so accessed, the data storage element A4 may be either read or written by means of the driver or sensor associated with PW3. It should become apparent then that if one particular set of the unplated wires were to be designated as word-oriented access wires and if the other set of wires were to be designated as bit-oriented access wires then multiple-mode access would be possible by means of these two sets of wires. For purposes of discussion herein the unplated wires designated by letters will be treated as the word-oriented access wires and those designated by numerals will be treated as the bit-oriented access wires.

Consider now the operation of the array illustrated in FIG. 2. If, as determined hereinabove, the alphabetically designated unplated lines access words and the numerically designated unplated lines access bits then it can be seen that data storage element A4 would contain bit 4 of word A and similarly the elements C2 would contain bit 2 of word C. It can be further seen that an excitation of unplated line A will access the four illustrated bits associated with the word A. Similarly, an excitation of the unplated line 2 will access bit 2 of all the illustrated words. An excitation of any of the unplated lines designated alphabetically will allow the bits so accessed to be read or written in a word-oriented mode. Similarly, the excitation of any of the lines designated numerically will allow the bits so accessed to be read or written in a bit-oriented mode. It is therefore evident that it is the provision of a dual set of unplated access of interrogation lines which provides for the multiple access capability of the instant invention.

It should become readily apparent from an understanding of the operation of the array illustrated in FIG. 2 that certain data organization problems must be overcome such that the array may be utilized in a computer system. As can be seen from that array, each of the plated wires contains one bit of each of the illustrated words and no plated wire contains the same bit of any two words. This of course is necessary to achieve the multiple access characteristic. However, this data storage element arrangement results in a shifted lineal order of data with respect to the plated wires when bits or words are to be read or written. FIG. 3a illustrates this shifted lineal order for a word-oriented access to the array. As can be seen from the chart of FIG. 3*a* when word A is accessed bit 1 is found on PW4, bit 2 on PW1, bit 3 on PW2, and bit 4 on PW3. The chart further illustrates these arrangements for words B, C, and D. As can be seen from the chart of FIG. 3*a*, as the various words are accessed the bits of all the words maintain a constant relative but a shifting absolute position with respect to each other. It can be further seen in FIG. 3*b* that in a bit-oriented access of the array the words maintain a constant relative but a shifting absolute position with regards to each other. It is of course most desirable that a data interface be provided wherein the data to be written into or read out of the array may always be found in a consistant order. In a word-oriented mode it is desirable that the data be placed into the data interface in a proper absolute bit order, and in a bit-oriented mode the data be placed in the data interface in the proper word order. In other words, in a word-oriented access any particular position in the data interface should contain the same bit regradless of the word accessed, and in a bit-oriented access any particular position in the data interface should contain a bit of the same word regardless of the bit accessed. This situation may be readily achieved by noting again the relationships of the charts of FIG. 3. Since in both modes of access the data associated with the accessed data storage elements maintains a proper relative order but an improper absolute order with respect to each other a simple shifting network is required to shift the order of the data from the data interface into the array or from the array and into the data interface the proper number of positions necessary to achieve the desired consistant order in the data interface. Such shifting networks are commonly available and well understood by those skilled in the art. For example, if all bits of word C were placed in a data interface to be written into word C of the array, then the data would have to be shifted one position to the right such that it would have the proper lineal order when written into the array. Similarly, when reading the same data from the array the data would then have to be shifted three positions to the right such that it would be placed into the data interface in the proper lineal order. This same relationship of course holds true for a bit-oriented access. It can be seen then that the number of shifts to be performed by the shifting network is controlled by the bit or word to be accessed and whether a read or write operation has been designated. It should of course be understood that the same shifting network may be used for both reading and writing operations on the array. Simple gating networks to select the source of data into the shifting network and the destination of the data out of the shifting network are readily conceivable by one skilled in the art.

There are of course other unique aspects of the instant invention which are correlated with the multiple access characteristic. In the standard plated wire memory, as illustrated in FIG. 1, a particular problem, known as creep, is often encountered when several bits of any one word are written simultaneously. For example, if it is desirable to write a 1 into bits A2 and A4 of the array illustrated in FIG. 1, then it would be necessary to drive a current indicative of a logical 1 in the plated wire A and, coincident with this current, drive bit currents in the unplated wires 2 and 4. The coincidence of these two currents at the bits A2 and A4 would result in the storing of logical 1's therein. However, of chief concern is the effect that such a writing has upon a bit between the two bits written and lying on the same wire. In the example given, concern is over the effect of such an operation upon the bit A3. The bit currents in the unplated wires 2 and 4 induce magnetic flux along the hard-axis of the plated wire A; this flux being the strongest at the points A2 and A4. However, a certain amount of this flux "creeps" from A4 toward A3 and from A2 toward A3. If the spacing between the bits along the plated wire is not adequate then it can be seen that the creep from bits A2 and A4 might be sufficient at A3 to cause a logical 1 to be written thereinto. It is therefore necessary in the design and construction of standard plated wire memories to give careful consideration to the bit spacing along the plated wires. No such problem exists in arrays according to the teachings of the instant invention. As can be seen from the array illustrated in FIG. 2, in both a word-oriented access and a bit-oritented access there is never an interrogation of any two bits on the same plated wire. This is due to the unique storage arrangement which provides for the multiple access approach. As can be seen from that array, each plated wire contains one bit of each word and no identical bit of any two words.

A further unique aspect of the instant invention may again be noted by reference to the array of FIG. 2. As can be seen therefrom, the accessing of bits in either of the two modes of operation may be achieved by the actuation of a single bit driver. For instance, to access all bits of word D a bit strap driver driving unplated wire D would be actuated and similarly, in accessing one bit of all words a single strap driver would be actuated to drive unplated wire 1. In both modes of operation only a single strap driver is actuated at any particular time. As is well understood by those skilled in the art, this characteristic is readily adaptable to the utilization of commonly available selection matrices. In contrast, reference should be made to the array of FIG. 1 wherein it can be seen that to write all bits of any word there must be actuated a number of bit drivers equivalent to the number of bits in the word.

As can be readily appreciated, the instant invention provides a multiple access memory immune to creep and requiring a substantially lesser amount of hardware for interrogation purposes than plated wire memories presently in the art.

With a present understanding of the general construction and operation of the multiple access plated wire memory, attention should now be turned to particular considerations to be given in the construction of such an array. As is well understood by those skilled in the art, the current flowing in unplated wires sets up a magnetic field which effects the magnetic state of the plated wire along what is known as the hard-axis which is in the longitudinal direction of the plated wire. As is further well known to those skilled in the art, the maximum flux along the hard-axis of the plated wire will be induced by current in the unplated wire when the two wires are orthogonal to each other. However, it should be noted that the multiple access plated wire memory teaches that at least one of the unplated interrogation lines associated with each of the storage elements pass over the plated wire at some angle other than 90°. FIG. 4 illustrates the consequences of such a relationship between the plated and unplated wire. In this figure it is shown that an unplated wire 12 passes over and loops under a plated wire 14 at an angle of $(90° + \theta)$ in accordance with the teachings of the invention. According to the right-hand rule, when a current I is made to flow in the unplated wire 12 as indicated in the figure a flux *a* is set up orthogonal to the axis of the loop of the unplated wire 12. Of course, the flux *a* is induced into the plated wire 14 at the point of crossover between the two wires but is shown in the position in the figure for illustrative purposes only. The magnitude of the flux *a* is of course proportional to the magnitude of the current I and comprises components *b* and *c* along the hard-axis and easy-axis of the plated wire 14 respectively. If the unplated wire 12 were orthogonal to the plated wire 14 then *c* would equal 0 and *a* would equal *b;* hat is, the entire flux induced by the current I in the unplated wire 12 would be induced along the hard-axis of the plated wire 14. It becomes evident then that as the angle $\theta$ increases the flux *b* along the hard-axis will decrease for any current I. It is therefore necessary to insure that the current I be sufficient to induce a proper flux *b* along the hard-axis of the plated wire 14. In other words, as the angle $\theta$ increases the component *b* decreases in value for any given current I such that it becomes necessary to increase the value of the current I so as to guarantee a proper flux along the hard-axis. Hence, considerations must be made of the fact that altering the angle between the unplated and the plated wires changes the amount of flux induced along the hard-axis and thus changes the requirements of the current in the unplated wire.

It should become readily apparent that there ar numerous possible arrangements which utilize the teachings of the instant invention. For example, FIG. 5 illustrares a multiple access plated wire memory wherein one set of the unplated wire, designated numerically, are orthogonal to the plated wires and the other set of unplated wires, designated alphabetically, crossover the plated wires at an angle slightly greater than 90°. Although this arrangement eliminates the necessity of increased current in the unplated wires to induce a sufficient flux along the hard-access of the plated wire, it should be noted that such an arrangement requires a large spacing l between the plated wires. As is understood by those skilled in the art, the storage elements along a plated wire must be separated by some distance s so as to prevent interference among adjacent storage elements. Hence it can be seen from FIG. 5 that $l = s/\tan\theta$ and consequently, for any given *s*, *l* must be increased if $\theta$ is to be reduced. However, the increase in *l* results in an increase in the physical size of the memory array. Thus it can be seen that a tradeoff must be made between the physical size of the array and the crossover angles between the unplated wires and the plated wires.

In the construction of multiple access plated wire memories particular consideration msut be given to the fringing effect which occurs when two interrogation straps are made to cross a plated wire at a particular point. FIG. 6 illustrates this fringing problem. FIG. 6*a* shows a plated wire 20 being crossed by unplated wires 22 and 24 wherein wire 22 is orthogonal to the plated wire 20 and wire 24 is non-orthogonal thereto. Of course, the data storage bit would be that area on the plated wire 20 crossed by both unplated wires 22 and 24. However, there are certain areas on the plated wire 20 which are crossed only by one of the unplated wires. These areas, designated generally by the numerals 26 and 28, extend the area of the plated wire 20 affected by the interrogation of the strap 24. The size and characteristics of the areas 26 and 28 are of course dependent upon the angle at which the unplated wire 24 crosses the plated wire 20. These fringe areas 26 and 28 must be taken into account when determining the spacing between bits along the plated wire 20. Consequently, it is most desirable to keep these fringing areas at a minimum. One approach toward minimizing the fringing problem is illustrated in FIG. 6*b* which is quite similar to the arrangement of FIG. 6*a* but for the replacement of the unplated wire 24 by a narrower unplated wire 30. The fringe areas 32 and 34 now created are of a substantially smaller area than those created in the configuration of FIG. 6*a*. However, particular notice should be taken that the characteristic impedance from that of unplated wire 22 and 24 of the unplated wire 30 has now been substantially altered and considerations of this fact must be made in designing the bit drivers to be associated therewtih. Here again then it may be seen that a tradeoff must be made between bit spacing, unplated wire width, and angle of crossover in order to achieve a particular bit spacing along the plated wires.

It should be recognized by one skilled in the art of the fabrication and design of plated wire arrays that difficulties may arise in the actual construction of the instant invention. Particularly, extreme care must be used to guarantee that both interrogation wires associated with each bit cross the plated wire upon which the bit is situated at exactly the same point. If the interrogation wires do not cross the plated wires at exactly the same points then it can be seen that the entire purpose of the instant invention will be defeated. To guarantee the uniformity and exactness throughout the array the instant invention suggests that the construction of the array be performed according to the teachings of the co-pending patent application Ser. No. 250,708 filed May 5, 1972 for Plated Wire Array and Method of Making the Same which has been assigned to the instant assignee. While other methods might well achieve the same desired result, it has been found that the method of the aforementioned invention uniquely lends itself to the construction of the instant invention.

As it has been noted above, any of numerous configurations of multiple access plated wire memories may satisfy the teachings of this invention. As was illustrated in FIG. 5, the two sets of unplated wires need not necessarily form the same angle with the plated wires; indeed, one set may be orthogonal to the plated wires while the other is not. Further, the unplated wires need not be of the same physical or electrical characteristics. Although any of numerous variations on the theme of the invention are possible, the preferred embodiment thereof would teach the arrangement according to FIG. 2. There it may be seen that each of the unplated wires crosses over the plated wires at an acute angle of 45° therewith. Since each of the unplated wires form the same angle with the plated wires the unplated wires may be driven by identical current drivers consequently simplifying the design of the system. Further, the provision of the 45° angles of crossover allow the greatest storage element packing density to be achieved. In this embodiment of the invention if the storage elements along the plated wires are separated by a distance s then the plated wires are separated by a distance *s*/2 and the interrogation of bits in either mode of access will result in the interrogation of bits separated by a distance of 0.707s. In a standard plated wire memory as illustrated in FIG. 1, the interrogated bits would have only been separated by a distance of $s/2$. Consequently, it can be seen that this embodiment of the instant invention not only allows multiple access to the data storage elements of the array but also allows a higher bit packing density without the threat of creep or interference among adjacent bits as is commonly encountered with high bit packing densities in the standard array arrangement.

It should be understood that the teachings of the instant invention are conductive to the basic technology understood in the art of plated wire arrays. That is, standard plated wire drivers, interrogate drivers for driving the unplated wires, sensing means to read data from the plated wires, dummy wires associated with the plated wires for noise suppression purposes, return paths for the unplated wires such that they pass both over and under the plated wires, terminations for both the plated and unplated wires, and other teachings and apparatus associated with the art of plated wire memories may be utilized in a multiple-access plated wire memory following the teachings of the instant invention. It should further be noted that the instant invention, consistant with the state of the art, teaches that at the points of crossover between the plated and unplated wires the wires should be within a proximity to each other so as to facilitate the flux coupling between the two.

Thus it can be seen that the objects of the instant invention have been met by the illustrations of the embodiments disclosed herein. While in accordance with the patent statutes, only the best known embodiment of the invention has been illustrated and described in detail, it will be understood that the invention is not limited thereto or thereby. Reference should be had to the appended claims in determining the true scope of the invention.

What is claimed is:

1. A multiple access memory array comprising:

a plurality of plated wires lying within a first plane arranged with respect to each other such that no plated wires cross each other;

a first plurality of interrogation wires lying within a second plane parallel to the first plane in such a relation to the pluality of plated wires that each of the plated wires and each of the plurality of interrogation wires cross each other at only one point; and a second plurality of interrogation wires lying within a third plane parallel to the first and second planes in such a relation to the plurality of plated wires and the first plurality of interrogation wires that each of the second plurality of interrogation wires crosses each of the plated wires and each of the first plurality of interrogation wires at only one point, that point being the same point where one of the first plurality of interrogation wires also crosses the plated wire.

2. The multiple access memory array according to claim 1 wherein the plated wires are so arranged as to lie in the first plane in a substantially parallel relationship with each other, all plated wires being spaced the same distance from immediately adjacent plated wires.

3. The multiple access memory array according to claim 2 wherein the first plurality of interrogation wires are so arranged as to lie in a substantially parallel relationship with each other in the second plane wherein each of the first plurality of interrogation wires is spaced the same distance from immediately adjacent interrogation wires, the second plane being in close proximity to the first plane.

4. The multiple access memory array according to claim 3 wherein the second plurality of interrogation wires are so arranged as to lie in a substantially parallel relationship with each other in the third plane wherein each of the second plurality of interrogation wires is spaced the same distance from immediately adjacent interrogation wires, the third plane being in close proximity to the first plane.

5. The multiple access memory array according to claim 1 which includes a shifting network connected to the plated wires thereof, the shifting netowrk controlling the lineal order of data into or out of the multiple access array.

6. A multiple access memory array comprising:

a plurality of plated wires lying in a first plane, each plated wire being parallel to and equally spaced from immediately neighboring plated wires;

a first plurality of unplated wires lying in a second plane, each such unplated wire being parallel to and equally spaced from its immediately neighboring unplated wire, the second plane lying parallel to and in close proximity with the first plane in such a manner that the unplated wires of the second plane cross the plated wires of the first plane such that acute angles are formed therebetween; and a second plurality of unplated wires lying in a third plane, each such unplated wire being parallel to and equally spaced from its immediately neighboring unplated wire, the third plane lying parallel to and in close proximity with the first plane in such a manner that the unplated wires of the third plane cross the plated wires at the same point that the unplated wires of the second plane cross the plated wires, the unplated wires of the third plane being skew to the unplated wires of the second plane and froming acute angles between themselves and the plated wires equivalent to the acute angles formed between the unplated wires of the second plane and the plated wires.

7. The multiple access memory array according to claim 6 wherein the acute angles formed between the plated wires and the unplated wires are 45° angles.

8. The multiple access memory array according to claim 7 which includes:

a fourth plane of substantially the same nature as the second plane, providing a return path for the unplated wires of the second plane such that the unplated wires of the second plane cross both over and under the plated wires at the same points; and a fifth plane, of substantially the same nature as the third plane, providing a return path for the unplated wires of the third plane such that the unplated wires of the third plane cross both over and under the plated wires at the same points.

9. The multiple access memory array according to claim 8 which includes a shifting network connected to the plated wires thereof such that the lineal order of data into and out of the array may be shifted.

10. A multiple access plated wire memory, comprising:

a first set of access lines lying in a first plane;

a second set of access lines, separate and distinct from the first set of access lines, lying in a second plane, the second plane being substantially parallel to the first plane; and a plurality of data storage elements lying in a third plane substantially parallel to the first and second planes, each data storage element being transversed by a single access line of the first set and a single access line of the second set and no two access lines being together common to more than one data storage element, the access lines obliquely transversing each other at the data storage elements.

* * * * *